United States Patent
Ram

(10) Patent No.: US 9,348,531 B1
(45) Date of Patent: May 24, 2016

(54) NEGATIVE POOL MANAGEMENT FOR DEDUPLICATION

(71) Applicant: Western Digital Technologies, Inc., Irvine, CA (US)

(72) Inventor: Tamir Ram, Sunnyvale, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 145 days.

(21) Appl. No.: 14/053,532

(22) Filed: Oct. 14, 2013

Related U.S. Application Data

(60) Provisional application No. 61/874,876, filed on Sep. 6, 2013.

(51) Int. Cl.
G06F 3/06 (2006.01)
G06F 12/08 (2006.01)
G06F 12/02 (2006.01)

(52) U.S. Cl.
CPC ............ *G06F 3/0641* (2013.01); *G06F 3/0608* (2013.01); *G06F 3/0668* (2013.01); *G06F 12/0253* (2013.01); *G06F 12/0866* (2013.01); *G06F 2212/461* (2013.01)

(58) Field of Classification Search
None
See application file for complete search history.

(56) References Cited

U.S. PATENT DOCUMENTS

| | | | |
|---|---|---|---|
| 7,454,443 B2 | 11/2008 | Ram et al. | |
| 7,979,670 B2 | 7/2011 | Saliba et al. | |
| 8,140,821 B1 * | 3/2012 | Raizen et al. | 711/202 |
| 8,200,923 B1 | 6/2012 | Healey et al. | |
| 8,291,183 B2 | 10/2012 | McCloskey et al. | |
| 8,341,117 B2 | 12/2012 | Ram et al. | |
| 8,407,190 B2 | 3/2013 | Prahlad et al. | |
| 8,412,682 B2 | 4/2013 | Zheng et al. | |
| 8,452,932 B2 | 5/2013 | Pangal et al. | |
| 8,458,131 B2 | 6/2013 | Bindal et al. | |
| 8,712,978 B1 * | 4/2014 | Shilane et al. | 707/693 |
| 8,825,720 B1 * | 9/2014 | Xie et al. | 707/813 |
| 2009/0049260 A1 | 2/2009 | Upadhyayula | |
| 2011/0113012 A1 | 5/2011 | Gruhl et al. | |
| 2012/0109907 A1 | 5/2012 | Mandagere et al. | |
| 2012/0209820 A1 * | 8/2012 | Patterson | 707/692 |
| 2013/0036289 A1 | 2/2013 | Welnicki et al. | |

OTHER PUBLICATIONS

Dilip Simha. RPE: The Art of Data Deduplication. Sep. 2011. http://www.ecsl.cs.sunysb.edu/tr/rpe21.pdf.*
Hennessy et al. Computer Architecture: A Quantitative Approach. 2007. Morgan Kaufmann. 4th ed. pp. 390-391, C-38-C-48.*
Dubnicki et al. "HYDRAstor: a Scalable Secondary Storage." Feb. 2009. USENIX. FAST '09. pp. 197-210.*

(Continued)

*Primary Examiner* — Nathan Sadler

(57) ABSTRACT

A method may comprise caching a portion of a pool of unique data blocks in a memory, the pool of unique data blocks comprising a plurality of unique blocks, at least some of the plurality of blocks in the pool of unique data blocks being referred to in at least one reference file. A list of blocks may be updated with any block in the cached portion of the pool of unique data blocks that is not referred to by at least one reference in the reference file(s). Different portions of the pool of unique data blocks may then continue to be cached and the list of blocks not referred to by at least one reference may be updated until the remaining portions of the pool of unique data blocks are cached. The blocks in the list of blocks may then be deleted from the pool of unique data blocks.

29 Claims, 5 Drawing Sheets

(56) References Cited

OTHER PUBLICATIONS

Efstathopoulos et al. "Rethinking Deduplication Scalability." Jun. 2010. USENIX. HotStorage '10.*

Simha et al. "A Scalable Deduplication and Garbage Collection Engine for Incremental Backup." Jul. 2013. ACM. SYSTOR '13.*
Partho Nath, "Evaluating the Usefulness of Content Addressable Storage for High-Performance Data Intensive Applications", HPDC '08, Jun. 23-27, 2008, 10 pages.

* cited by examiner

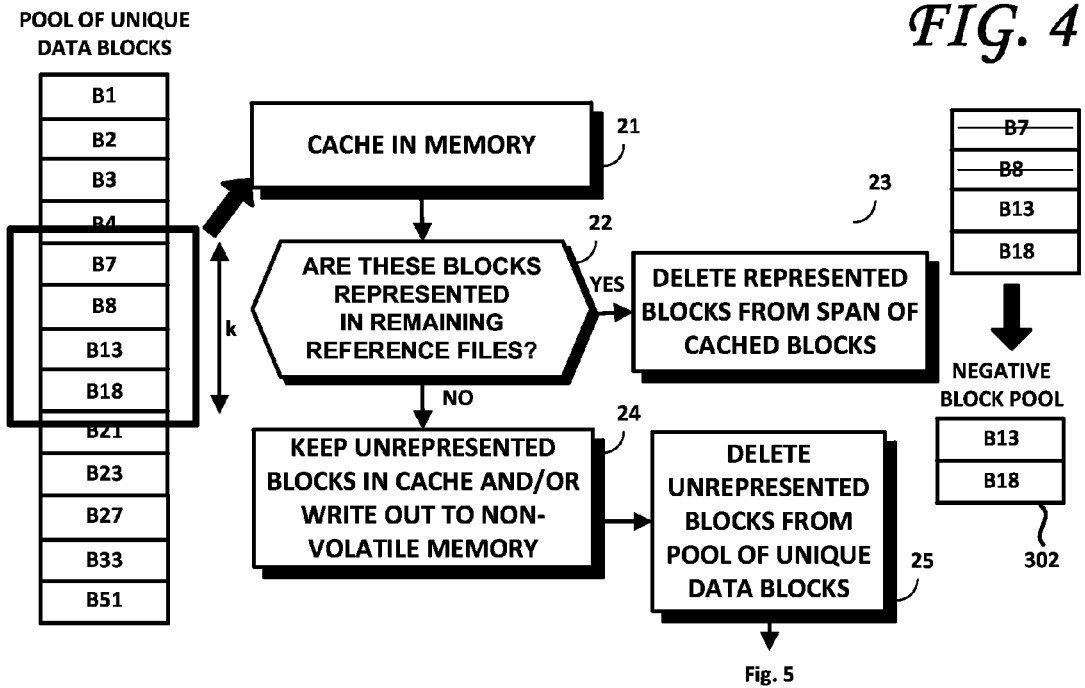
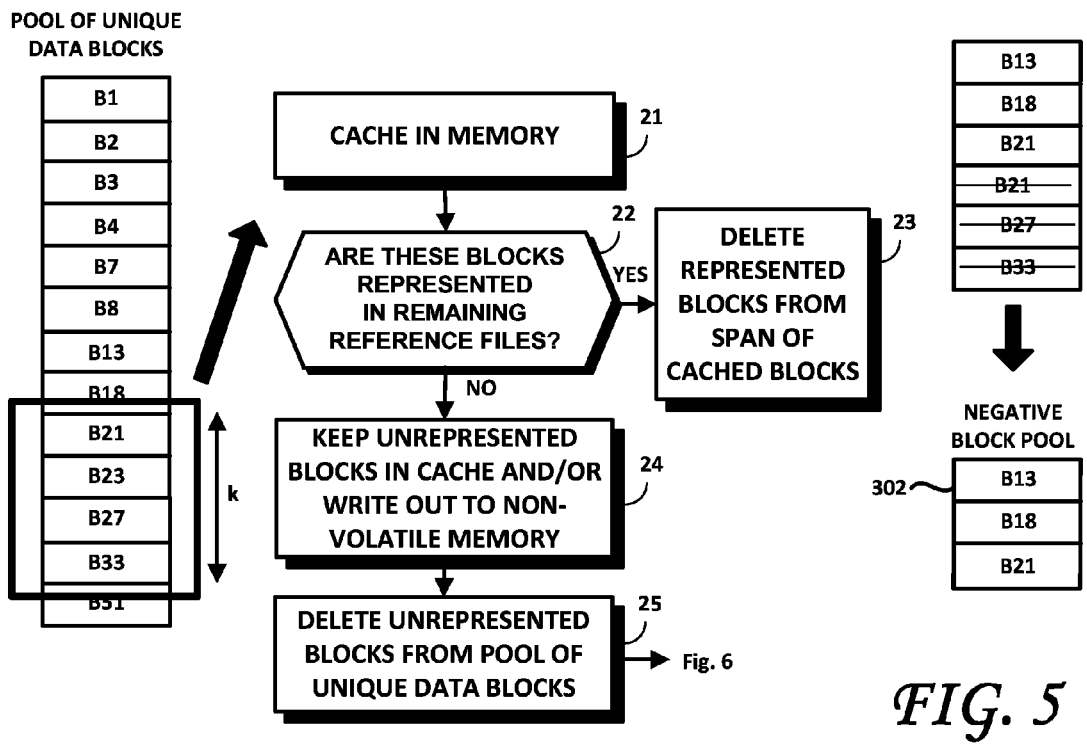

NEGATIVE POOL MANAGEMENT FOR DEDUPLICATION

CROSS-REFERENCE TO RELATED APPLICATIONS

The present application claims priority to U.S. provisional application 61/874,876 filed on Sep. 6, 2013, which application is incorporated herein in its entirety.

BACKGROUND

As the growth of enterprise data accelerates, organizations struggle to find more efficient ways to manage this data. One emerging approach to controlling data growth is data deduplication. Data deduplication technologies are especially relevant to backups because—despite careful use of differential and incremental backup strategies—a large fraction of backups consists of duplicate data.

BRIEF DESCRIPTION OF THE DRAWINGS

FIG. 4 is a block diagram illustrating still further aspect of one embodiment.

FIG. 5 is a block diagram illustrating other aspects of one embodiment.

DETAILED DESCRIPTION

Deduplication, also called "dedupe," removes duplicate information as data is stored, backed up, or archived. The dedupe process may be carried out at the file level, where duplicate files are replaced with a marker pointing to one copy of the file, and/or at the sub-file or byte level, where duplicate bytes of data are removed and replaced by references, resulting in a significant decrease in storage capacity requirements.

Data deduplication is a technology that reduces data volume by identifying and eliminating redundant data. Early technologies for single-instance storage, based on file-grain deduplication, have largely disappeared in favor of block-based deduplication, in which files are represented as multiple blocks. Each block of a file is compared to known blocks. If a block has been previously stored, the block is simply referenced rather than stored again. Each block, stored only once, may then be compressed using encoding technologies.

After saving many different backups, however, it may become expedient to delete some older backups. Some of the blocks referenced in these older backups to be deleted are also used in in newer backups. Some of the blocks referenced in the older backup or backups to be deleted, however, find no counterpart in any of the newer backups.

Figure 1:
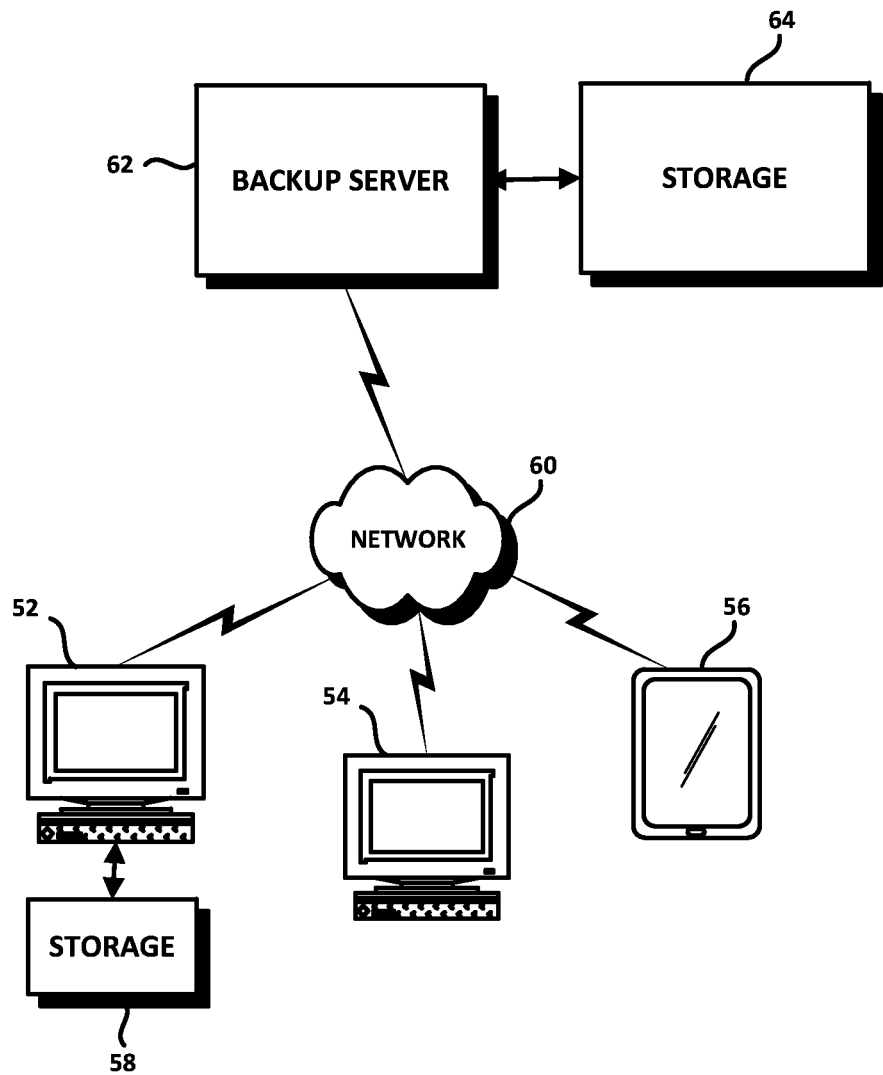
FIG. 1 is a block diagram of an environment in which embodiments may be practiced.

FIG. 1 is a block diagram of an exemplary environment in which embodiments may be practiced. As shown therein, a server (e.g., a backup server) 62 may be coupled or otherwise configured to access a network 60. The server 62 may be coupled to storage 64, either directly as shown in FIG. 1 or through the network 60. The storage 64 may comprise non-transitory, tangible storage including, for example, hard disk drives, solid state storage, or hybrid storage comprising both hard disk and solid state storage. The storage 64 may be configured, for example, as a Network Attached Storage (NAS), a Direct Attached Storage (DAC), a Redundant Array of Independent Disks (RAID) and/or may be differently configured. According to one embodiment, the storage 64 may be configured to store backups and the server 62 may be configured to process backups or otherwise carry out or embody the functionality described herein. A number of client computing devices are shown at 52, 54 and 56. The computing devices 52, 54 and 56 may be coupled to the backup server through the network 60. The computing devices 52, 54 and 56 may be configured, according to one embodiment, to send data (such as data files to be backed-up) to the backup server 62 for processing. One or more of the computing devices 52, 54 or 56 may be coupled to external storage, as shown at 58. The external storage 58 may be configured as NAS, DAC or RAID, for example, and may be directly coupled to a computing device or may be accessible by a computing device over the network 60. Any of the computing devices 52, 54 and 56 may also be configured to process backups or otherwise carry out or embody the functionality described herein.

Figure 2:
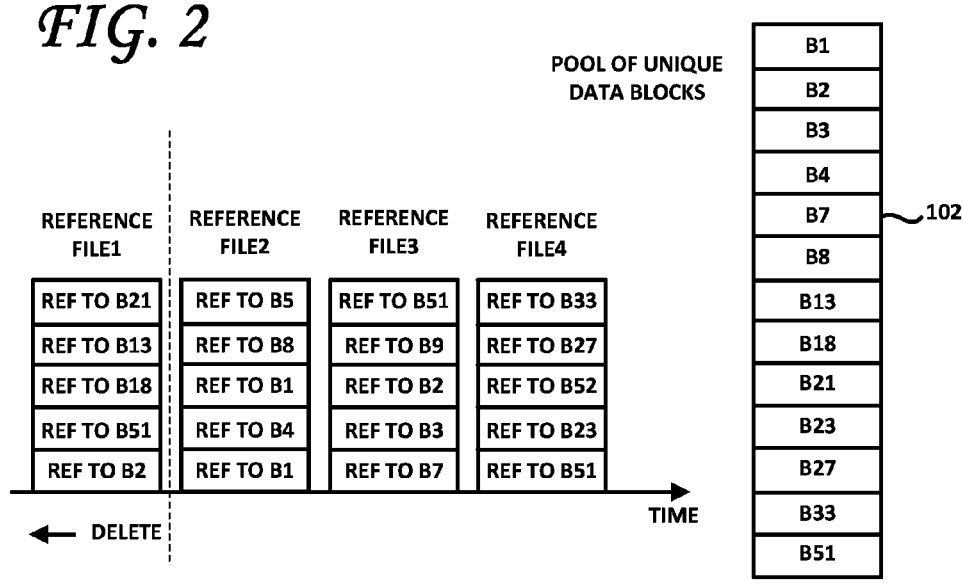
FIG. 2 is a block diagram illustrating aspects of one embodiment.

FIG. 2 is a block diagram illustrating aspects of one embodiment. As shown therein, each backup may comprise a Reference File comprising references to blocks within a pool of unique data blocks 102. A Reference File, according to one embodiment, may comprise block identifiers (which may include a hash value, e.g. MD5) and size. Rather than storing even a compressed version of the backup data as backups, embodiments store references (pointers, in one embodiment) that reference separately-stored blocks. For example and with reference to FIG. 2, Reference File1 comprises references to blocks B21, B13, B18, B51 and B2. These blocks are not stored in the backup per se, but are separately stored in the pool of unique data blocks 102. In this manner, block B2 need not be stored once in Reference File1 and again in Reference File3. Similarly, two instances of the same block B2 need not be stored in the pool of unique data blocks 102. Indeed, the pool of unique data blocks 102 may be configured to comprise a single instance of each block referenced by the references within the Reference Files. One or more of the blocks within the pool of unique data blocks 102 may be pointed to once in the Reference Files and one or more of the blocks within the pool of unique data blocks 102 may be referenced or represented in more than one Reference File. For example, both Reference File1 and Reference File3 store a reference to block B2, a single instance of which is stored in the pool of unique data blocks 102.

The aforementioned need to occasionally delete some older backups means that one or more of the blocks in the pool of unique data blocks 102 may be referenced in the Reference File(s) to be deleted, and in no other of the remaining Reference Files. This means that the pool of unique data blocks 102 would then store blocks that are not referenced by any of the backup Reference File files. Over time, the size of the pool of unique data blocks 102 may become unnecessarily large, occupying more storage space than is optimally required, necessitating greater memory and processing resources to handle. That is, some blocks in the pool of unique data blocks 102, although still uniquely represented, may not be needed anymore, as none of the Reference Files contain references to those blocks.

According to one embodiment, it may be desired, therefore, to remove data blocks from the pool of unique data blocks 102 that are not referenced in any of the Reference Files. According to one embodiment, this may be carried out in an efficient manner, without requiring the entire large pool of unique data blocks 102 to be loaded in memory. Indeed, there may be not enough room in memory to store all of the constituent blocks of the pool of unique data blocks 102 in memory, or it may be undesirable or sub-optimal to do so. Failure to load all of the blocks of the pool of unique data blocks in memory may also result in the loss of some of the blocks referenced by one or more of the Reference Files, which is unacceptable.

One method for culling the pool of unique data blocks 102 of unreferenced blocks would be to traverse each of the Reference Files and mark those blocks in the pool of unique data blocks 102 in memory that are used and to delete the data blocks of the pool of unique data blocks 102 that are not referenced in any of the Reference Files. The end result would be a large file of blocks that are indeed present in the Reference Files. However, this method is inefficient and is particularly memory-intensive to implement.

Figure 3:
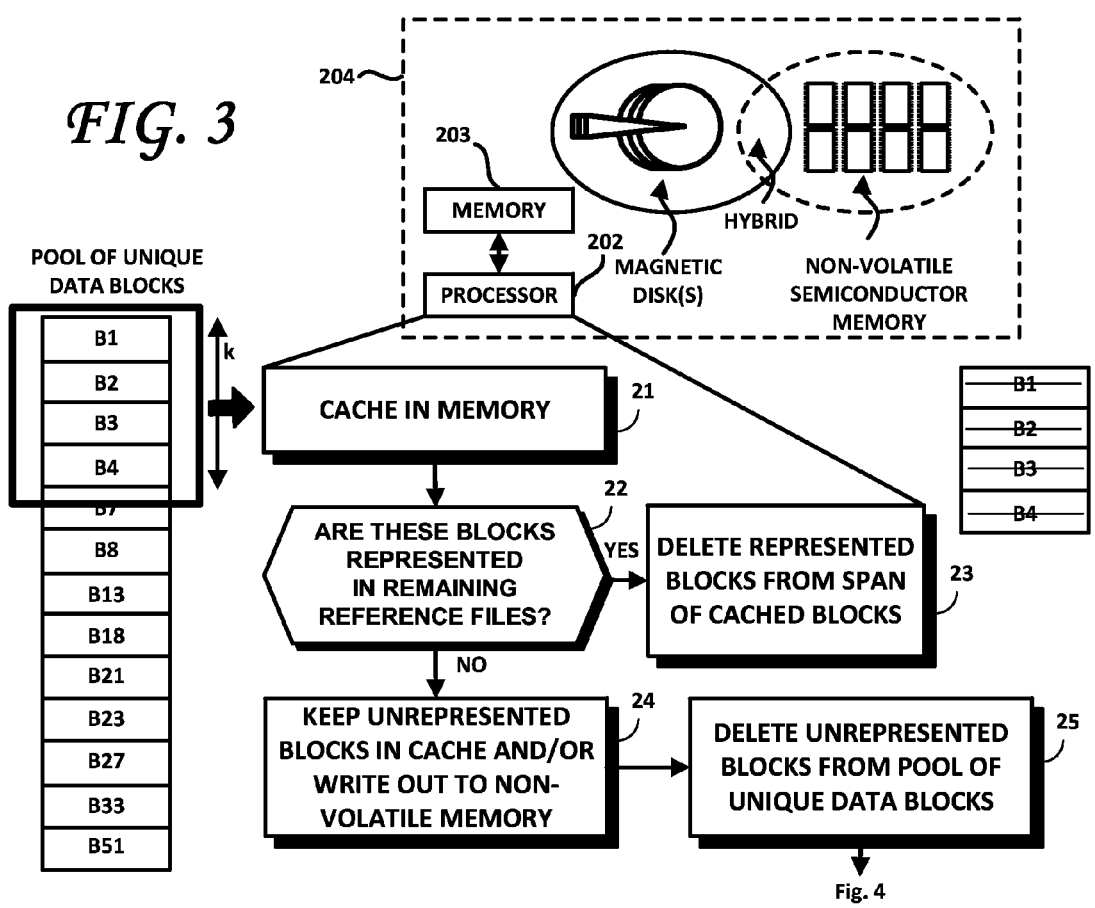
FIG. 3 is a block diagram illustrating further aspects of one embodiment.

As shown beginning in FIG. 3, one embodiment caches (or otherwise stores) a manageable span of k blocks of the pool of unique data blocks 102 as shown at block 21, and compares the cached span of k blocks with the blocks referenced in the Reference Files, as suggested at 22. The span of k data blocks may be fewer than all data blocks of the pool of unique data blocks 102, although all data blocks of the pool of unique data blocks 102 may be considered together if the pool of unique data blocks is sufficiently small. If a block of the k-cached blocks is represented in one or more of the Reference Files (YES branch of 22), such a block may be deleted or marked for deletion from the cached span of k blocks, as called for at 23. If a data block under consideration is not referenced by any of the Reference Files (NO branch of 22), then this or these un-represented data blocks may be kept in the cached and/or written out to non-volatile memory as shown at 24. The non-volatile memory may comprise, for example, a solid state storage device (SSD), a hard disk drive or a hybrid drive. FIG. 3 shows the exemplary case in which the first four blocks B1-B4 are indeed referenced within one or more of the remaining Reference Files Reference File2 and Reference File3 (shown in FIG. 2) and are, therefore, deleted or otherwise marked for deletion from the cached blocks, as suggested by the interlineations of B1, B2, B3 and B4 in FIG. 3. The unrepresented data blocks (if any) may then be deleted from the pool of unique data blocks, as shown at 25, whereupon the next span of k-blocks may be processed, as shown in FIG. 4. Note that this deleting of unrepresented data blocks may be carried iteratively or all of the unrepresented data blocks may be deleted from the unique pool of data blocks after all spans of k-blocks of the unique pool of data blocks have been cached and processed.

Having processed the first k-blocks, the next (or some other non-contiguous span of) k blocks of the pool of unique data blocks 102 may then be processed and cached, as shown in FIG. 4. In FIG. 4, blocks B7, B8, B13 and B18 of the pool of unique data blocks 102 are processed. Again, it is determined, according to one embodiment, whether one or more of the Reference Files (the remaining Reference Files, not counting the older deleted backup Reference File (Reference File1 in FIG. 2)) comprise a reference (a pointer, according to one embodiment) to block B7. Since Reference File3 comprises just such a reference, block B7 is deleted, marked for deletion or otherwise removed from the cached span of k blocks and not written out to non-volatile memory. The same is the case for cached block B8, to which a reference exists in Reference File2. The next two cached blocks; namely blocks B13 and B18 are not represented in any of the remaining Reference Files and may thus be kept in cache memory and may be written out to non-volatile memory, as shown at 24. Alternatively, according to one embodiment, the unrepresented data block(s) may simply be kept in volatile memory and written out only if needed, such as may occur, for example, if the pool of unique data blocks clean-up process described herein were to be interrupted. Whether written out to non-volatile memory or not, the unrepresented data blocks may be stored or otherwise referenced in a so-called "negative block pool" 302. Thus, the negative block pool 302, according to one embodiment, may store data blocks that are not referenced by any of the backup Reference File(s) and that may, therefore, be removed from the pool of unique data blocks 102. The unrepresented data block(s) (B13 and B18, in this case) may then be deleted from the pool of unique data blocks, as shown at 25, whereupon the next span of k-blocks may be processed, as shown in FIG. 5.

Figure 6:
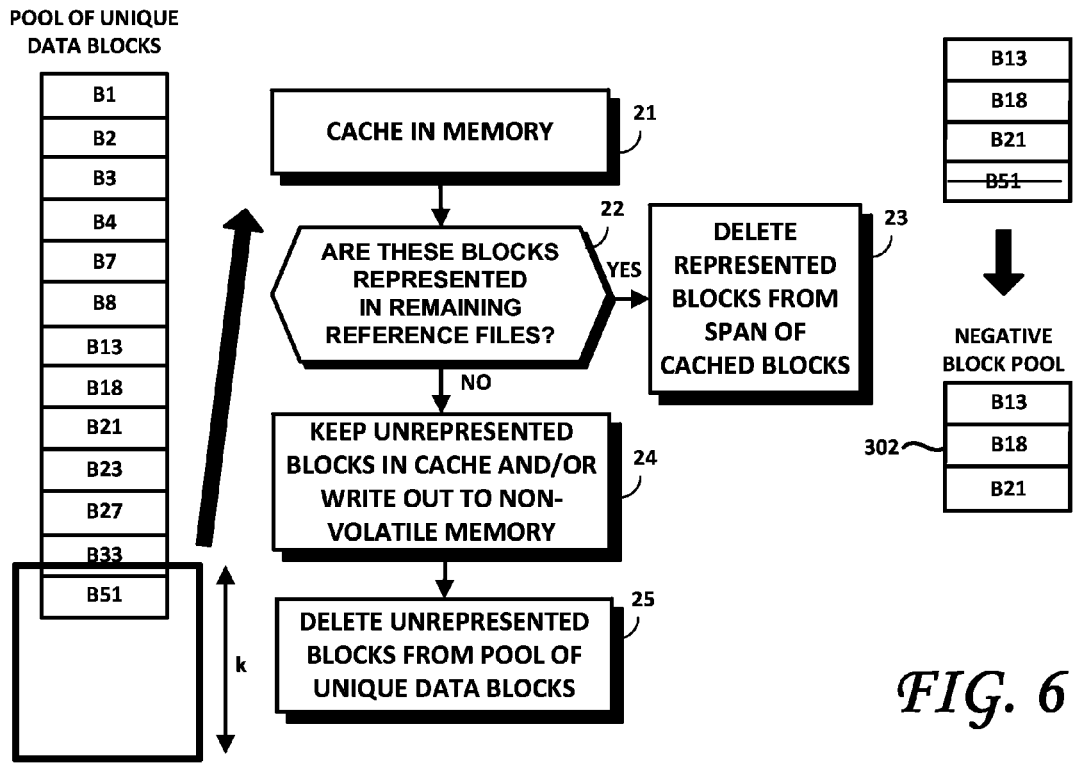
FIG. 6 is a block diagram illustrating other aspects of one embodiment.

The next (or some other) span of k blocks may then be processed. As shown in FIG. 5, this span of k blocks includes blocks B21, B23, B27 and B33. These data blocks are examined in turn and it is determined whether they are referenced by any of the references in the remaining backup Reference Files 2-4. In this example, data block B21 is not represented in any of the Reference Files 1 to 4 and is, therefore, added to the negative block pool 302. Blocks B23, B27 and B33 are, however, represented in at least one of the Reference Files 2-4. Therefore, these represented blocks are not added to the negative block pool 302, whose constituent members remain B13, B18 and B21. The unrepresented data block(s) (B21 in this case) may then be deleted from the pool of unique data blocks, as shown at 24, whereupon the next span of k-blocks may be processed, as shown in FIG. 6.

The next (not necessarily contiguous) span of k blocks may then be processed. As shown in FIG. 6, this span of k blocks includes only block B51. Block B51 is, therefore, examined to determine whether it is referenced by any of the references in the remaining backup Reference Files 2-4. In this example, block B51 is, in fact, represented in Reference Files 3 and 4 and is not, therefore, added to the negative block pool 302, whose constituent members remain unchanged at B13, B18 and B21. In this span of k-data blocks, there are no unrepresented data block(s) that should be deleted from the pool of unique data blocks at 25.

Figure 7:
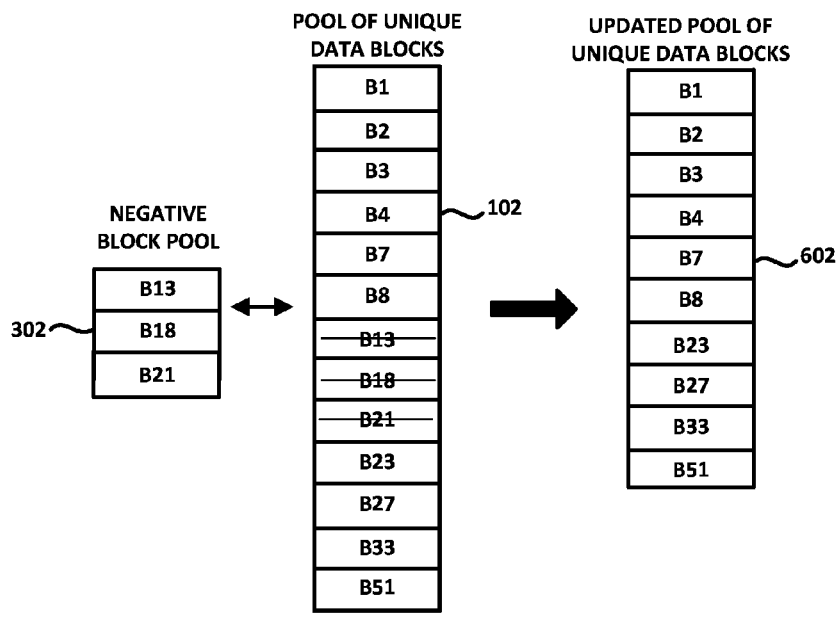
FIG. 7 is a block diagram illustrating further aspects of one embodiment.

As shown in FIG. 7, according to one embodiment, if the unrepresented data blocks have not been already iteratively deleted from the pool of unique data blocks 102 (e.g., at 25 in FIGS. 3-6), this negative block pool 302 may then be compared with the data blocks in the pool of unique data blocks 102. According to one embodiment, any match in the pool of unique data blocks 102 (that is, any block in the negative block pool 302 that has a counterpart in the pool of unique data blocks 102) is deleted, as that matching block is not used in any of the Reference Files. According to one embodiment, after the negative block pool 302 is compared with the pool of unique data blocks 102 and any matching blocks are removed from the pool of unique data blocks 102, the so-updated pool of unique data blocks 602 is free of blocks that are not referenced in any of the Reference Files. In this case, the constituent blocks of the negative block pool 302 B13, B18 and B21 are removed from the pool of unique data blocks such that the updated pool of unique data blocks 602 comprises only B1, B2, B3, B4, B7, B8 B23, B27, B33, B5, each of which are referenced at least one in the remaining Reference Files 2-4.

Figure 8:
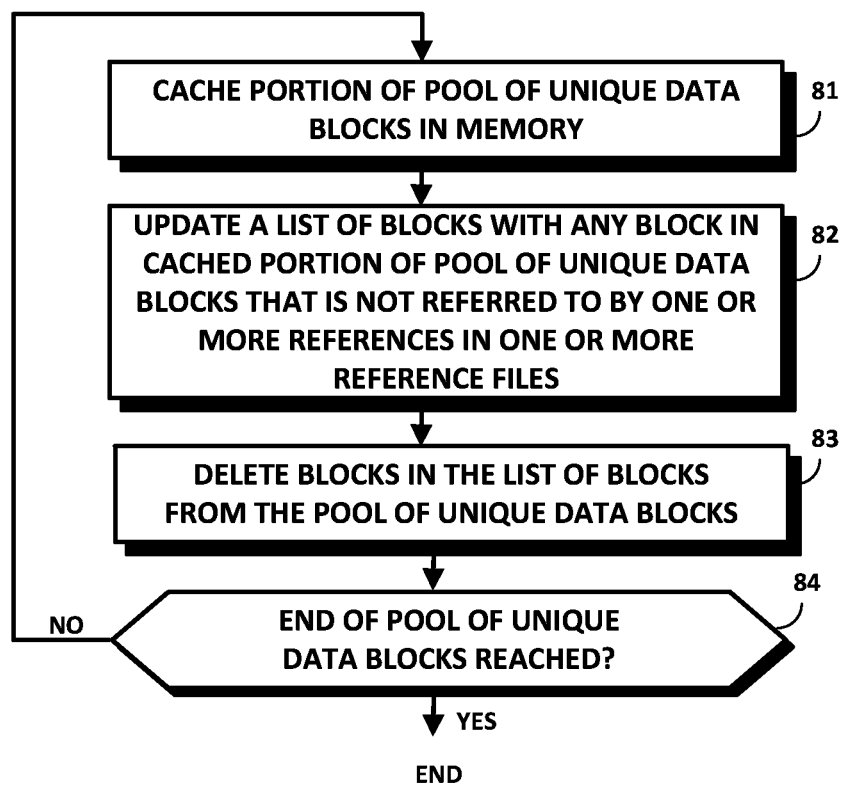
FIG. 8 is a block diagram illustrating yet aspects of one embodiment.

FIG. 8 is a flowchart of a method according to one embodiment. Such a method may be executed by a processor, such as shown at 202 in FIG. 3. Such a processor 202 may execute the method responsive to stored data representing sequences of instructions which, when executed by the processor 202, cause the device 204 (or the server 62 or computing device 52, 54, 56 of FIG. 1) containing the processor 202 to implement the method shown in FIG. 8. The device 204 may comprise, for example, a NAS, a RAID and/or other forms of mass storage. As shown, 81 calls for caching or otherwise storing a portion of a pool of unique data blocks 102 in a memory, such as memory 203 coupled to processor 202 shown in FIG. 3. A list of blocks may then be updated, as shown at 82, with any block in the cached portion of the pool of unique data blocks 102 that is not referred to by one or more references in one or more of the Reference Files, such as Reference Files 2-4 in FIG. 2. This process may then continue by iteratively, as shown at 84, caching different portions of the pool of unique data blocks 102 (sequentially or otherwise) as shown at 81, updating the list of blocks not referred to by at least one reference as shown at 82 and by deleting blocks in the list of blocks from the pool of unique data blocks 102 as shown at 83 until, as shown at the YES branch of 84, the end of the pool of unique data blocks 102 is reached (YES branch of 84). According to one embodiment, if 83 is not iteratively carried out for each cached portion of the pool of unique data blocks in memory, as illustrated at FIG. 7, the blocks in the list of blocks may then be deleted from the pool of unique data blocks 102. At this stage, whether updated iteratively or after all spans of k-data blocks have been cached and processed, the updated pool of unique data blocks (such as shown at 602 in FIG. 7) contains only data blocks that are referenced at least one in the remaining Reference Files 2-4.

According to one embodiment, an index file or other mechanism may be used to track progress through the pool of unique data blocks 102 in k-span sized chunks. This index file also allows the process to be interrupted at any time and resumed (at the point of interruption, for example) at some later point in time. According to one embodiment, an intervening new Reference File (e.g., a newly-created backup file) may cause the process to back up and re-check the pool of unique data blocks for blocks contained in this new FTL, to ensure that the negative pool does not contain blocks that are referenced by this newly created intervening (between stopping the dedupe process and resuming it) Reference File. The dedupe process described herein may be carried out periodically according to some predetermined interval, as needed or as otherwise determined to be advisable. The re-checking of the pool of unique data blocks 102 for potentially un-referenced blocks need not be carried out upon the creation of new Reference Files, as such re-checking may simply be carried out when the next dedupe process is scheduled or carried out. The dedupe process according to embodiments may be carried out without interfering with the processing of data access commands from a host. For example, the dedupe process described and shown herein may be carried out, for example, as a background process.

According to one embodiment, by considering only a span of k blocks at a time (k being smaller, according to one embodiment, than the span of the pool of unique data blocks), the amount of memory required is lower than it otherwise may be and the dedupe process may be carried out very efficiently. Accordingly, after the dedupe process according to one embodiment is carried out, the deduped and updated pool of unique data blocks is not only free of duplicate blocks, but is also free of blocks that are not used by any of the Reference Files. Accordingly, backups are more efficient and the process of deleting old backups may be carried out in a streamlined manner while conserving any blocks that are used by other backups.

While certain embodiments of the disclosure have been described, these embodiments have been presented by way of example only, and are not intended to limit the scope of the disclosure. Indeed, the novel methods, devices and systems described herein may be embodied in a variety of other forms. For example, one embodiment comprises a tangible, non-transitory machine-readable medium having data stored thereon representing sequences of instructions which, when executed by computing devices, cause the computing devices to implementing a distributed file system as described and shown herein. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

What is claimed is:

1. A method, comprising:
   caching a portion of a pool of unique data blocks in a memory, the pool of unique data blocks comprising a plurality of unique blocks, at least some of the plurality of blocks in the pool of unique data blocks being referred to in at least one reference file;
   updating a list of blocks with any block in the cached portion of the pool of unique data blocks that is not referred to by at least one reference in the at least one reference file;
   iteratively caching separate portions of the pool of unique data blocks and updating the list of blocks not referred to by at least one reference until the remaining portions of the pool of unique data blocks have been cached; and
   deleting, from the pool of unique data blocks, the blocks in the list of blocks.

2. The method of claim 1, wherein updating comprises:
   if the at least one reference to the block is present in the at least one reference file, deleting the block from the memory;
   if the at least one reference to the block is not present in the at least one reference file, retaining the block in the memory; and
   updating the list of blocks with the blocks retained in the memory.

3. The method of claim 1, further comprising writing the list of blocks to a non-volatile memory.

4. The method of claim 1, wherein the at least one reference file is stored in a disk drive.

5. The method of claim 1, wherein the pool of unique data blocks is stored in a disk drive.

6. The method of claim 1, configured to be interrupted to process at least one data access command received from a host and to be resumed where interrupted when the at least one data access command has been processed.

7. The method of claim 1, configured to be performed when at least one reference file is to be deleted.

8. The method of claim 1, configured to be performed as a background process.

9. The method of claim 1, configured to be performed when at least one new reference file is added.

10. The method of claim 1, configured to be performed as part of a deduplication process.

11. The method of claim 1, wherein at least one newly cached portion of the pool of unique data blocks overwrites a previously cached portion of the pool of unique data blocks.

12. The method of claim 1, wherein the at least one reference comprises at least one pointer to a data block in the pool of unique data blocks.

13. The method of claim 1, wherein deleting is performed after updating and before continuing caching different portions of the pool of unique data blocks.

14. A device, comprising:
a data storage device;
a memory; and
a controller coupled to the memory and configured to control storage and retrieval of data from the data storage device, the controller being further configured to:
cache a portion of a pool of unique data blocks in the memory, the pool of unique data blocks comprising a plurality of unique blocks, at least some of the plurality of blocks in the pool of unique data blocks being referred to by at least one reference in at least one reference file;
update a list of blocks with any block in the cached portion of the pool of unique data blocks that is not referred to by at least one reference in the at least one reference file;
iteratively cache separate portions of the pool of unique data blocks and update the list of blocks not referred to by at least one reference until the remaining portions of the pool of unique data blocks have been cached; and
delete, from the pool of unique data blocks, the blocks in the list of blocks.

15. The device of claim 14, wherein the controller is further configured to update the list of blocks by:
if the at least one reference to the block is present in the at least one reference file, deleting the block from the memory;
if the at least one reference to the block is not present in the at least one reference file, retaining the block in the memory; and
updating the list of blocks with the blocks retained in the memory.

16. The device of claim 14, wherein the controller is further configured to write the list of blocks to the data storage device.

17. The device of claim 14, wherein the pool of unique data blocks is stored in the data storage device.

18. The device of claim 14, wherein the at least one reference file is stored in the data storage device.

19. The device of claim 14, wherein the controller is further configured to be interrupted to process at least one data access command received from a host and to resume where interrupted when the at least one data access command has been processed.

20. The device of claim 14, wherein the controller is further configured to at least one of cache, update, continue caching, and delete when at least one reference file is to be deleted.

21. The device of claim 14, wherein the controller is further configured to at least one of cache, update, continue caching, and delete as a background process.

22. The device of claim 14, wherein the controller is further configured to at least one of cache, update, continue caching, and delete when at least one new reference file is added.

23. The device of claim 14, wherein the controller is further configured to at least one of cache, update, continue caching, and delete as part of a deduplication process.

24. The device of claim 14, wherein the device comprises a Network Attached Storage (NAS).

25. The device of claim 14, wherein the device comprises a Redundant Array of Independent Disks (RAID).

26. The device of claim 14, wherein the data storage device comprises a disk drive.

27. The device of claim 14, wherein the controller is further configured such that at least one newly cached portion of the pool of unique data blocks overwrites a previously cached portion of the pool of unique data blocks.

28. The device of claim 14, wherein the at least one reference comprises at least one pointer to a data block in the pool of unique data blocks.

29. The device of claim 14, wherein the controller is further configured to delete, from the pool of unique data blocks, the blocks in the list of blocks after the list of blocks is updated and before other portions of the pool of unique data blocks are cached.

* * * * *